United States Patent [19]

Studtmann

[11] 3,829,758
[45] Aug. 13, 1974

[54] AC-DC GENERATING SYSTEM
[75] Inventor: George H. Studtmann, Mount Prospect, Ill.
[73] Assignee: Borg-Warner Corporation, Chicago, Ill.
[22] Filed: Feb. 2, 1972
[21] Appl. No.: 222,939

[52] U.S. Cl. .......................... 322/28, 322/47, 322/94
[51] Int. Cl. ............................................... H02p 9/00
[58] Field of Search ............. 322/20, 27, 47, 94, 28; 321/5, 45 C

[56] References Cited
UNITED STATES PATENTS

| | | | |
|---|---|---|---|
| 2,578,679 | 12/1951 | Edwards | 322/20 |
| 3,316,479 | 4/1967 | Frierdich | 322/27 |
| 3,384,804 | 5/1968 | Salihi | 321/5 |
| 3,656,006 | 4/1972 | Bourke et al. | 321/5 UX |
| 3,675,117 | 7/1972 | Reimers | 322/47 X |
| 3,688,182 | 8/1972 | Johnson | 321/45 C X |

Primary Examiner—William M. Shoop, Jr.
Attorney, Agent, or Firm—Donald W. Banner

[57] ABSTRACT

An induction machine driven as a generator has its output connections coupled to the output connections of a static inverter circuit, connected to operate not as an inverter but as a switching system. A capacitor is coupled to the bus conductors of the switching system. D-c excitation is furnished to the induction generator system only for starting, and is then disconnected. At rated speed the static inverter circuit operates as a switching system to regulate connection of the capacitor to the induction generator on a time-sharing basis, replacing the directly connected capacitor bank in known systems. In multi-phase systems the capacitor is not required, as the switching system periodically directs the flow of reactive energy from one phase to another of the inductive machine. By regulating the frequency of the switching operation the overall system can be made to generate effectively over a wide range of input speeds. An a-c output voltage is available from the common terminals between the induction generator and the switching system, and a d-c output voltage is also available from separate conductors of the switching system.

11 Claims, 9 Drawing Figures

PATENTED AUG 13 1974  3,829,758

SHEET 1 OF 2

AC-DC GENERATING SYSTEM

BACKGROUND OF THE INVENTION

Induction machines have long been used for both motor and generator functions, because such machines are among the simplest and most durable of rotating machinery. By driving the machine above synchronous speed, it functions as a generator if properly excited. Conventionally this has meant the use of an external supply or bank of capacitors coupled to the generator, to provide the necessary reactive energy handling circuit and allow the machine to function as a generator. It is well known to those skilled in the art that the induction generator cannot supply either its own reactive field energy, or any energy to a reactive load. Accordingly with an inductive load, a bank of capacitors will supply the appropriate correction of the power factor. Similarly an external supply can furnish the lagging current required by the induction generator. By itself the induction generator is incapable of supplying reactive energy, which must come from an independent source. This is also true as respects excitation of its own field, for this energy must also be supplied.

A main problem with known induction machine systems is that they are generally restricted to operate at one speed, considering the mechanical input and the resonant frequency, as determined by the machine inductance and external capacitance, or the frequency of an external supply. Thus the system is inherently incapable of operating satisfactorily at variable speeds.

It is therefore a primary consideration of this invention to provide a system including an induction machine which is operable at variable speeds and with variable loads, with regulation to maintain either constant frequency or constant voltage output notwithstanding the speed and load variations.

Another important consideration of the invention is to provide such a system which can operate at relatively high speeds, and does not require slip rings or a commutator arrangement.

It is another significant consideration of the present invention to provide a system which supplies controllable a-c and/or d-c output voltages.

SUMMARY OF THE INVENTION

A power transfer system connected in accordance with this invention is effective to provide a-c and/or d-c output voltages. The system comprises an induction machine having a mechanical input shaft and a plurality of output conductors for supplying an a-c output voltage. Circuit means, which may be a simple switch-and-battery arrangement, is provided to supply an excitation voltage and enable the induction machine to build up during start-up. Some means is also provided to rotate the input shaft of the induction machine.

The present invention includes a switching arrangement which periodically couples capacitance on a time-sharing basis to the output windings of the induction machine. One switching arrangement found suitable is a bridge-type inverter circuit, periodically switched in a manner similar to normal inverter switching to regulate the time the capacitance is coupled to the induction machine. The periodic switching is effected as the thyristors are sequentially rendered conductive and nonconductive to direct the reactive energy from one phase circuit to another of the inductive machine. Thus although "inverter" or "static inverter" is used hereinafter to describe the circuit of the switching system, it is emphasized this circuit is not actually inverting a d-c voltage to an a-c voltage, but is functioning as a switching system.

The present invention includes a switching system, connected in a manner similar to a static inverter circuit. The switching system has a plurality of output connections coupled to the output conductors of the induction machine, and a plurality of additional connections coupled to a capacitor. The capacitor is not required in multi-phase systems, in which the switching system periodically directs the flow of reactive energy from one phase to another of the induction machine. The switching system also has a plurality of semiconductor switches, such as SCR's or transistors, connected to receive gating signals for controlling the switching frequency. An oscillator-and-logic circuit is connected to regulate operation of the semiconductor switches in the switching system, to regulate the frequency or the amplitude of the output a-c energy supplied by the power transfer system.

THE DRAWINGS

In the several figures of the drawings, like reference numerals identify like components, and in the drawings.

GENERAL DISCUSSION OF INDUCTION MACHINES

Figure 1:
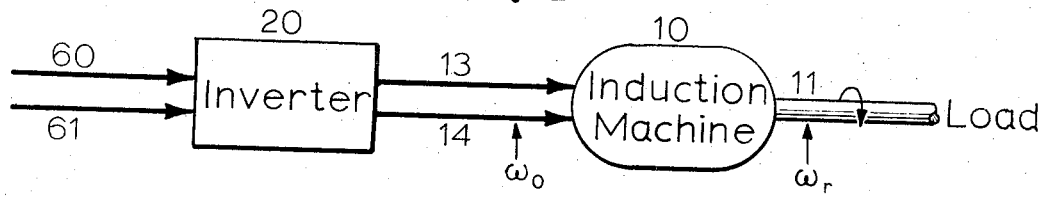
FIG. 1 is a block diagram of a known inverterdriven induction machine system.

It is generally well known in the art to interconnect a simple system as depicted in FIG. 1. As there shown an induction machine 10 when operated as a motor provides output power over a shaft 11 to any suitable mechanical load (not shown). Electrical energization for the motor is received over conductors 13 and 14 from an inverter 20 which in turn receives d-c energy over conductors 60, 61 from a battery or any suitable source of unidirectional potential difference. With fixed-value components in inverter 20, the frequency of the output voltage supplied over lines 13, 14 is at some reference frequency $\omega_0$. The angular velocity of the rotating field within machine 10 is at this frequency, $\omega_0$. To develop the requisite torque for a given load, the rotor of machine 10 turns at a frequency $\omega_r$ which is below the speed $\omega_0$ of the rotating field. As the load approaches zero, the speed of the rotor approaches that of the rotating field, and the slip value is reduced. The well-known expression for the slip s in an induction motor is $s = \omega_0 - \omega_r/\omega_0$. By way of example, if the energy from inverter 20 is at 60 Hertz, and the shaft 11 of a two-pole induction motor 10 is rotating at 57 rps (revolutions per second), the slip is 0.05, or five percent. The rotor goes slightly slower than the field, and the extent of this difference is increased as the load on the motor is increased, to provide a correspondingly increasing torque.

Figure 2:
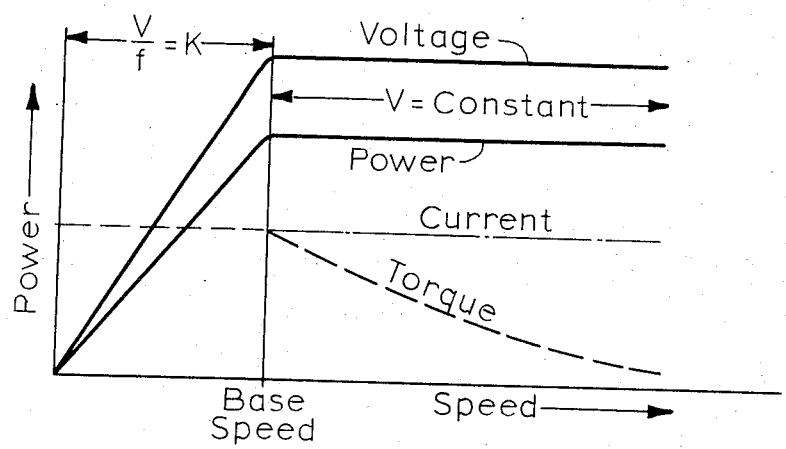
FIG. 2 is a graphical illustration.

FIG. 2 depicts various characteristics of an induction machine operated as a motor. The curves are idealized. The output power increases linearly up to the base speed, and then remains constant above the base speed. Below base speed, the machine is capable of producing a constant torque level as indicated by the broken line. Above base speed, the torque drops off as the speed is increased; however, the current remains constant. The voltage out of the induction machine under these conditions is the same as that supplied to the machine. Above the base speed the voltage is constant, and below base speed the voltage decreases concomitantly with the frequency. As shown, the ratio of voltage to frequency is constant ($V/f=K$) from the base speed down to zero. All these induction motor characteristics are general and well known.

Now consider the machine more generally, as an induction machine and not just a motor. If the induction machine can be operated as a motor over a given speed range, it is usually possible to operate the same machine over the same speed range as a generator, obtaining a similar electrical output. Accordingly above the base speed the output voltage should be controlled so as not to exceed a predetermined value, and the load controlled so as not to exceed a preset current level. This will enable the machine to generate a constant power, if required. Below the base speed the power generating capability should decay in a linear manner as described, and likewise the voltage should be controlled to similarly decay. Considering the basic electromagnetic structure, with a desired torque and given voltage and current values, the same values would be required whether the machine is operating as a motor or a generator. The difference is that when operating as a generator, the direction of the current flow—previously from inverter to machine—is reversed, and now flows out of the machine. If the slip value is considered from the expression given above, the sign of the slip becomes negative. For example, if $\omega_o$ is still 60 Hertz and $\omega_r$ is raised to 63 Hertz, then the slip s is minus five percent. With this slip the induction machine 10 in FIG. 1 will be operated as a generator, providing a-c energy over lines 13, 14.

Figure 3:
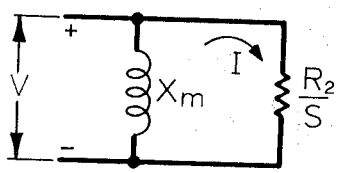
FIGS. 3 and 4 are equivalent circuit diagrams.
Figure 4:
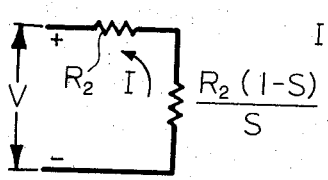

Further to assist in understanding the alternative motor and generator operations of the same induction machine the equivalent circuit of the machine will be set out. FIG. 3 depicts such a circuit, where a voltage V is applied across the magnetizing branch labeled $X_m$, the mutual inductance over which power is transferred from the stator to the rotor. The current I flows into a resistive branch in which the rotor resistance is represented by the term $R_2/s$. This effective resistance can further be separated into two components, $R_2$, and $R_2(1-s)/s$, as shown in FIG. 4. The power dissipation in first resistance $R_2$ represents the losses as a result of current flow through the rotor, and the power dissipation in the second effective resistance $R_2(1-s)/s$ represents the power transfer leg. With V applied as shown, the power output of the motor is the amount of energy absorbed in the resistor $R_2(1-s)/s$.

It is manifest that when the slip s is positive and less than unity, the algebraic sign of the expression is also positive, and thus the power output of the system is positive. However if shaft 11 (FIG. 1) is driven faster than the frequency $\omega_0$, the sign of s becomes negative, and the sign of the entire expression $R_2(1-s)/s$ becomes negative. This indicates that the power output of this system, and the output torque, is negative; that is, the induction machine is now operating as a generator when the system requires torque, rather than delivering torque or output power.

Figure 5:
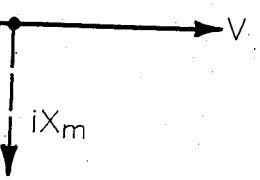
FIG. 5 is a vector diagram, useful in understanding operation of induction machines.

One way of analyzing operation of the induction machine as it changes between motor and generator operation is to consider that the voltage V (FIGS. 3 and 4) is always applied in the same sense. When operating as a motor (FIG. 3), the current I is transferred into the load. That is, the current has a plus sign, and the slip s is likewise positive in value. Now if the shaft speed is suddenly increased with the same voltage V applied, the current I in effect diminishes and suddenly reverses direction, to flow as indicated in FIG. 4. Thus (in effect) the voltage V remains the same, but the current and the slip s are reversed in algebraic sign in the transition from motor operation to generator operation. With this reversed current flow, as shown in FIG. 4, the relative phase of the voltage $iX_m$ required in the magnetizing branch is depicted in FIG. 5. As there shown the phase of current I is reversed from that of the applied voltage V, and the voltage vector representing the drop across the mutual inductance branch is indicated by the broken line. Nevertheless the "work", whether operating as a motor or generator, is accomplished by the current passing through the equivalent real value of resistance, which is displaced 90 degrees from the vector $iX_m$ representing the reactive energy. For this reason a capacitor bank has been utilized in prior art arrangements, to supply the required reactive current. A source of a-c energy could also be utilized, but of course such a source is generally fixed in frequency.

DETAILED DESCRIPTION OF THE INVENTION

Before considering the structure and method of this invention, it is important to note that a salient portion of the invention is in the analysis and understanding of the basic induction machine operation, and the realization that control of a switching system, inserted between the machine and the system capacitance, allows the same machine to function as a motor and generator with essentially the same characteristics. The system is "tuned" to a certain frequency by the values of the machine inductances and the system capacitance—this capacitance is usually fixed. However by regulating the switching system, the effective capacitance value can be changed to correspondingly change the frequency of the system a-c output voltage. Considering the expression for slip, by regulating the frequency of switching system operation there is a regulation of $\omega_o$ as the system tuning is changed. Notwithstanding any variation of $\omega_r$, related to the speed of the induction machine shaft, this control of $\omega_o$ allows the construction of a system in which both the sign and magnitude of the slip can be regulated, and thus the operation of the machine in the motor and generator modes is correspondingly controlled. This appreciation of the insertion of a system of controlled switching, in the overall circuit between the machine and the capacitance, in effect provides workers in this art with a "handle" for regulating one of the terms in the expression for the slip, thus to control the overall system. With this background the structure and operation of the inventive system will now be set out.

Figure 6:
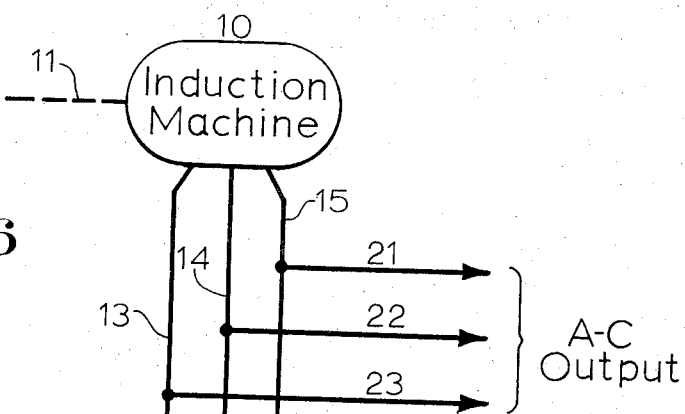
FIG. 6 is a block diagram of a power transfer system connected in accordance with this invention.
Figure 6:
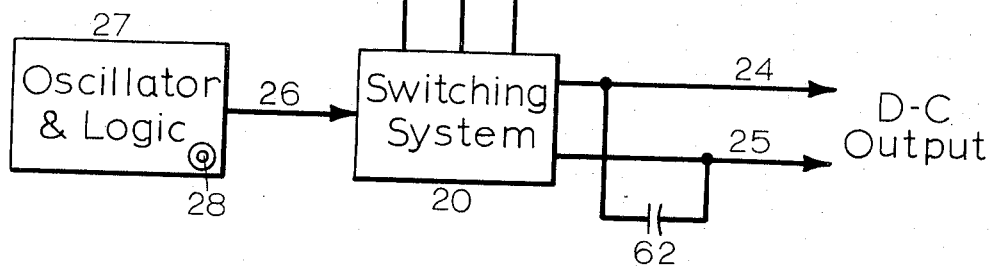

As shown in FIG. 6 a conventional induction machine 10 includes a mechanical drive shaft represented by broken line 11. Any suitable prime mover (not shown) can supply rotational drive to shaft 11. Such a prime mover can be an electrical motor, gasoline driven engine, turgine, or any other suitable unit for rotating shaft 11. When the prime mover rotates shaft 11, to drive induction machine 10 to start up as an induction generator, some means for providing an excitation voltage is normally required for system start-up. One arrangement, including a battery and switch for closure during start-up will be explained hereinafter in connection with FIG. 7. Those skilled in the art will appreciate that the switch could also provide excitation energy by "dumping" energy stored in a capacitor bank at start-up, or a transformer-rectifier arrangement could be utilized to supply the requisite excitation. Alternatively magnetization of the rotor components may be sufficient to supply start-up excitation internally, without any external energy supplied as just described.

Particularly in accordance with the present invention, a switching system 20 and capacitor 62 are provided as shown generally in FIG. 6, to supply reactive energy for the induction machine. The output connections of system 20 are coupled to the induction machine output connections over conductors 13, 14 and 15. A capacitor 62 is coupled to additional connections of system 20. When an inverter circuit is employed as the switching system, these additional connections can be made on the d-c bus conductors. Thus the switching system 20 and capacitor 62 in effect replace the bank of capacitors or a-c source conventionally used with an induction generator. With this arrangement an a-c output voltage can be provided over conductors 21, 22 and 23, or a d-c output voltage can be provided on the bus conductors 24, 25 of the switching system. Either or both of these output voltages can be provided.

The frequency of operation of the SCR's or other semiconductor switches in system 20 is controlled by signals received over line 26 from an oscillator-and-logic circuit 27. The oscillator-and-logic circuit 27 can comprise well-known oscillator and ring counter arrangements. For example, the SCR manual of G.E., Second Edition, copyright 1961, shows a suitable circuit for the oscillator, shown as a "Basic Trigger Circuit" in FIG. 4.12 on page 46. The same publication shows a ring counter, or "Three Stage SCR Ring Counter Circuit", in FIG. 7.17 on page 109. Rotation of knob 28 in FIG. 6 of this application is analogous to varying the resistance of $R_1$ in the basic trigger circuit on page 46 of this publication. Knob 28 represents a means for varying the frequency of the timing signals, and thus vary the switching frequency to regulate the effective capacitance in the system and thus control the amplitude of the output voltage supplied by the system. With this perspective of the system as a whole, a more detailed illustration of switching system 20 is given in FIG. 7.

Figure 7:
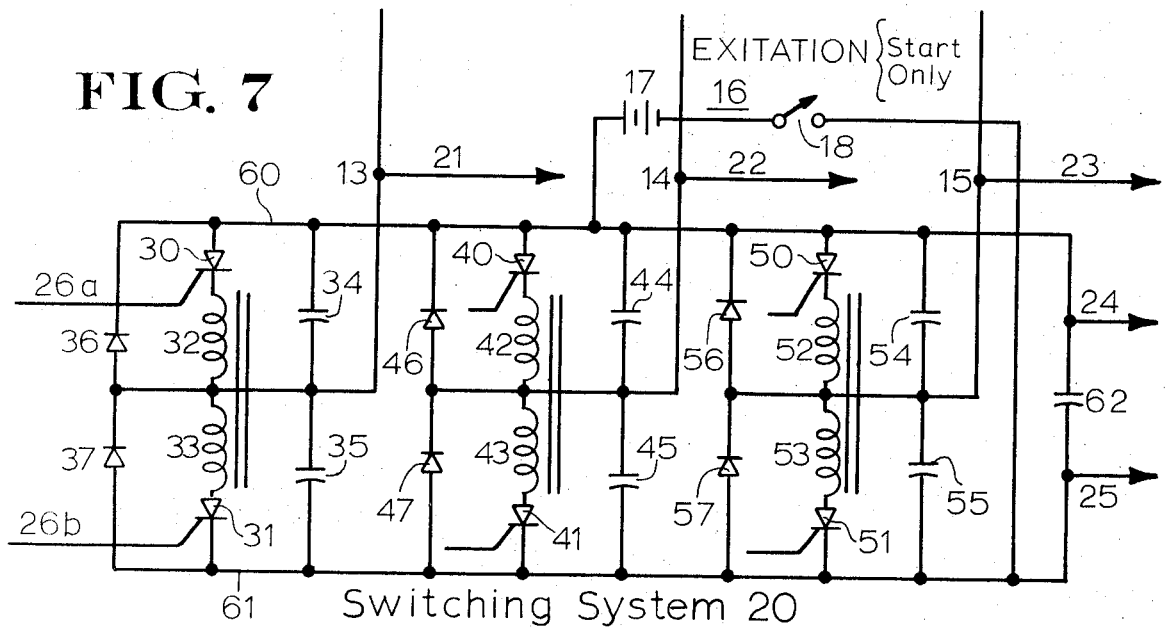
FIG. 7 is a schematic diagram of an inverter circuit suitable for providing time-controlled switching of the capacitor with the induction machine.

As there shown, the switching system comprises three individual phase circuits coupled between the bus conductors 60, 61. The first phase circuit includes a pair of SCR's 30, 31 coupled in series with windings 32, 33 of a conventional commutating choke assembly. Commutating capacitors 34, 35 are coupled in series between bus conductors 60, 61 as are the spillover diodes 36, 37. Conductor 13 is coupled to the common junction between capacitors 34, 35; to the common junction between choke windings 32, 33; and to the common electrical connection between diodes 36, 37. Other components for protecting the illustrated circuit against high dv/dt and di/dt changes may of course be incorporated in the illustrated circuit without changing the basic nature and function of system operation. The second and third phase circuits are identical to the just-described first phase circuit, and the related components are referenced in the 40 and 50 series of reference numerals. Although the switching system 20 depicted in FIG. 7 is identical to the circuit of a three-phase bridge inverter, the system is not inverting a d-c voltage on lines 60, 61 to provide output voltage on lines 13, 14 and 15. instead the times during which capacitor 62 is connected, over lines 13-15, to the inductive windings in machine 10 are regulated by the conduction intervals of switches 30, 31, 40, 41, 50 and 51. This regulation of the effective capacitance provides the "handle" described above to regulate system operation.

Timing signals for SCR's 30, 311 are received over conductors 26a and 26b to control the gating-on of the switches. Of course, conductor 26a in practice would include a pair of conductors, with the other conductor coupled to the cathode of SCR 30 to provide the turn-on signal. Thus the single line 26 in FIG. 6 actually represents a dozen conductors, with two conductors being utilized for the individual gating signals to each SCR.

Circuit means referenced 16 is provided for applying an excitation voltage to the induction machine during start-up of the system. In the illustrated arrangement a battery 17 is coupled in series with a switch 18 for providing this energization only when the system is started, and the machine, operating as a generator, is driven up approximately to its operating speed.

With the conductors 13, 14 and 15 coupled to the induction generator as described, an a-c output voltage is produced on conductors 21-23. In addition a d-c output voltage is available on conductors 24, 25. Thus the flexibility of the novel system is manifest. The d-c energy on conductors 24, 25 is real energy. If no a-c energy is drawn out over conductors 21-23 to an external load, there is only reactive energy circulating through the SCR's in the inverter circuit. With high power factor, high efficiency machines this reactive k.v.a. and the losses of the total system is a relatively small percentage of the total power.

In actual tests a machine rated at 110 volts was utilized for induction generator 10. A voltage of approximately 15 volts, supplied as indicated by battery 17 in FIG. 7, was provided and the machine brought up to rated operation with this energization. It is emphasized that all the external energy input was then removed as switch 18 was opened. the ¼ horsepower machine satisfactorily delivered rated energy, both d-c and a-c, to a resistance load. A second induction machine was coupled to the conductors 21-23 and operated as a motor from the a-c energy provided.

Figure 8:
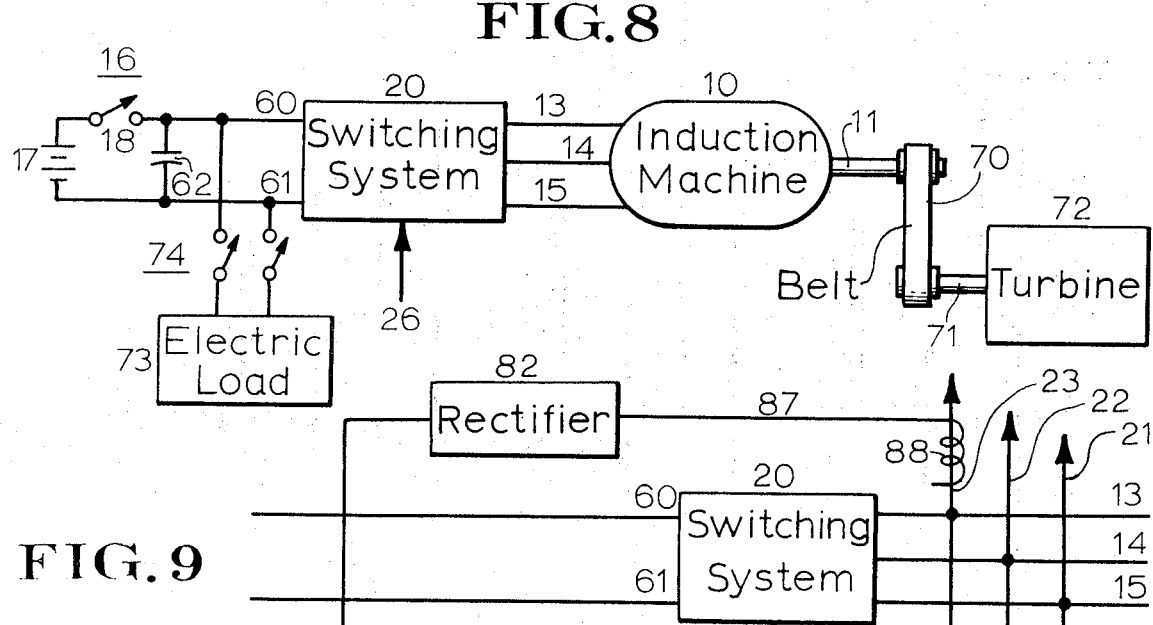
FIG. 8 is a block diagram, partly in schematic form, depicting another system arrangement employing the principles of the invention.

FIG. 8 shows another system arrangement of induction machine 10 and inverter 20. As there shown, shaft 11 of induction machine 10 is coupled over a belt 70, or any suitable mechanical coupling arrangement, to shaft 71 of a turbine 72. In this arrangement battery 17 is coupled, when switch 18 is closed, to the bus conductors 60, 61 of switching circuits 20. Closure of switch 74 places an electrical load 73 across the d-c bus.

In operation, it is assumed that turbine 72 is to be started from a dead stop. Initially both switch 18 and switch 74 are in the open position as shown. Switch 18 is closed and d-c energy is supplied to switching system 20, which initially is operated as an inverter to provide a-c energy over common conductors 13, 14 and 15. This energizes induction machine 10 which is driven as a motor, providing mechanical output energy in the rotation of shaft 11. This rotational movement is translated over belt 70 into the rotation of shaft 71, to start turbine 72 and bring it up to speed. As turbine 72 approaches normal running speed, it begins to operate on its own and switch 18 is opened so that battery 17 no longer supplies any energy to switching system 20.

Energy now moves in the other direction through the system shown in FIG. 8. That is, mechanical energy from shaft 71 is transferred over belt 70 to shaft 11, to drive induction machine 10 as a generator. The operation of the switches in system 20 is now controlled, not to provide inverter operation, but to control the time-sharing connection of capacitor 62 to the inductive windings of machine 10. Of course the turbine must supply sufficient energy to drive machine 10 at least slightly above its rated speed to act as a generator. The system 20 and capacitor 62 replace the capacitor bank or independent a-c source, as explained above. Switch 74 is closed to place electrical load 73 across the d-c bus, which energizes load 73 with a d-c output voltage. Thus this arrangement of switching system 20 and induction machine 10 is effective to transfer a reversible energy flow.

In the general showing of FIG. 6 knob 28 represents a means for regulating the firing times of the SCR's or other semiconductors in switching system 20. With this regulation of operating frequency it is possible to maintain the system generating effectively over a wide range of input speeds, that is, wide variations of the speed of shaft 11. It is possible to effect the system regulation without any manual intervention, such as adjustment of knob 28. To this end a control system for providing overall system regulation is set out in FIG. 9.

As there shown, the frequency of the timing pulses provided by oscillator-and-logic circuit 27 is regulated by control signals received over lines 75 and 85 from a pair of comparator stages 76 and 81. Stage 76 is a voltage comparator, receiving a d-c signal related to the induction generator a-c voltage over line 77, which is coupled through a rectifier stage 79 to conductors 13-15. A reference voltage signal is received by comparator 76 over conductor 78 from a reference potentiometer 80, coupled between a point of positive potential and ground. Accordingly the output signal from comparator 76 is a function of changes in the amplitude of the induction generator a-c output voltage.

The other comparator stage 81 is a current sensing stage. A current transformer, represented by winding 88, provides a signal related to the a-c load current. This signal passes over conductor 87, rectifier 82, and conductor 83 to comparator 81. A second reference signal is provided over conductor 86 from another potentiometer 84, also coupled between a point of positive potential and ground. Thus the output signal on line 85 is a function of current variations on the a-c output conductors. The voltage comparator 76 is connected to effect normal regulation of the timing pulses on line 26. The current signal on line 85 is connected to override the normal regulation when a fault or other high-current condition occurs on the a-c output line.

Another way of viewing the invention is that of a novel and unobvious method of generating a-c and/or d-c voltages. This method includes the steps of providing an induction generator which has a mechanical input shaft and a plurality of output conductors, and providing a switching circuit of the static inverter type which has its output connections coupled to the output conductors of the induction generator. The d-c bus conductors of the switching circuit are coupled to the system capacitor, in a single phase system. To start the system the induction generator shaft is rotated and an excitation voltage, of approximately an order of magnitude less than the normal rated voltage level, is supplied to the induction generator. When the induction machine reaches approximately rated speed the start-up excitation voltage is removed; thus no electrical energy is supplied from any external source after start-up. Thereafter firing pulses are applied to the semiconductor switches in the switching circuit to regulate their respective turn-on times. This regulates the effective capacitance coupled to the machine windings in a single-phase system, or regulates the switching of the reactive energy from one machine phase winding to another in a multi-phase system, and thus governs the amplitude of the a-c output voltage supplied by the system.

For purposes of this explanation and the appended claims, values from one-fifth to five times a reference value is considered within the same order of magnitude. Thus if 115 volts is considered a reference voltage, then voltages in the range of 23 to 575 volts are within the same order of magnitude. Lesser and greater order are computed by powers of ten. That is, voltages an order of magnitude less than the reference voltage of 115 volts are in the range of 2.3 to 23 volts, and an order of magnitude greater are in the range of 575 to 5,750 volts. At the present time it has been established that startup is readily accomplished while supplying an excitation voltage of only 15 volts for a 115 volts machine; thus the excitation voltage for start-up is in the range of an order of magnitude less than the usual rated voltage of the induction machine.

Figure 9:
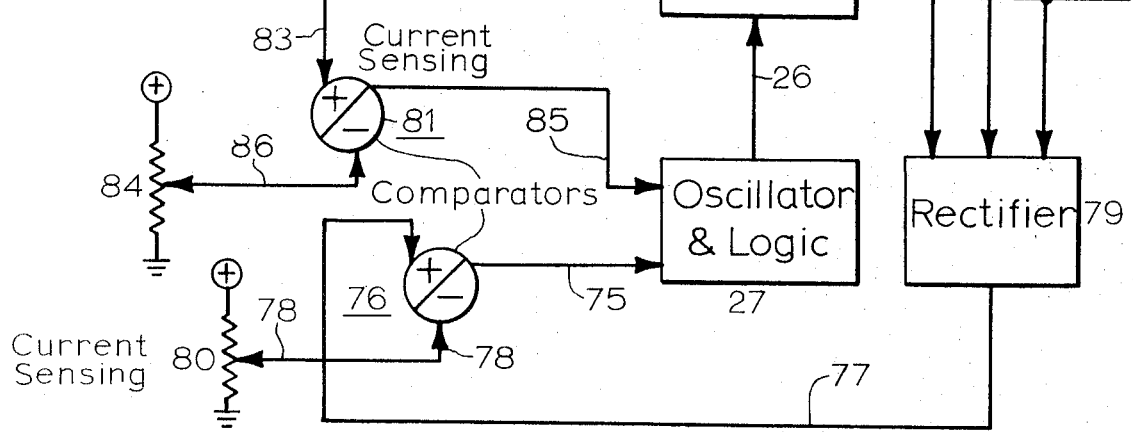
FIG. 9 is an illustrative diagram showing a control arrangement useful in conjunction with this invention.

Given a system such as shown in FIG. 6 or 8, automatic regulation of switching frequency as explained in connection with FIG. 9 provides a very significant advantage for the system of this invention. For example, in the system of FIG. 6 with a prime mover driving induction machine 10 as a generator to provide an a-c output voltage on lines 21–23, automatic regulation of the switching system 20 will maintain a constant amplitude of the a-c output voltage on conductors 21–23. This means that a precise voltage regulation is possible, even when the input rotation of shaft 11 may be very irregular and subject to considerable speed variation. Such a well-regulated output voltage from an unregulated driving shaft has long been sought in the power supply art. The system explained in connection with FIG. 9 makes practical the provision of such a well-regulated output voltage from an irregular input source.

Although the system has been explained with a capacitor such as 62 coupled to the switching system, it it emphasized that the capacitor is only required in a single-phase system. It has been determined that in a multi-phase system, the controlled gating of the semiconductors in the switching system is effective to periodically direct the flow of reactive energy from one phase to another of the induction machine, without any capacitor in the circuit.

While only particular embodiments of the invention have been described and illustrated it is apparent that various modifications and alterations may be made therein. It is therefore the intention in the appended claims to cover all such modifications and alterations as may fall within the true spirit and scope of the invention.

What is claimed is:

1. A power transfer system for providing a-c and/or d-c voltages, comprising:
    an induction machine having a mechanical input shaft, a plurality of output conductors for supplying an a-c output voltage, and means for enabling the induction machine to build up during start-up;
    a capacitor;
    a switching system, including a plurality of output connections coupled to the induction machine output conductors, and a plurality of additional connections coupled to said capacitor, said system including a plurality of switches connected to receive actuating signals to control the switching frequency; and
    means, including an oscillator-and-logic circuit, connected to regulate the actuating times of the switches in the switching system, to thus regulate the frequency or the amplitude of output a-c energy provided by the power transfer system.

2. A power transfer system as claimed in claim 1, in which the oscillator in the oscillator-and-logic circuit is connected to operate at a fixed frequency, thus maintaining a fixed frequency output a-c energy from the power transfer system.

3. A power transfer system as claimed in claim 1, in which the oscillator in the oscillator-and-logic circuit is connected to operate at a variable frequency as a function of variations in the speed of the mechanical input shaft of the induction machine, thus maintaining a constant amplitude of the output a-c energy from the power transfer system.

4. A generating system for providing a-c and/or d-c voltages, comprising:
    an induction machine having a mechanical input shaft, a plurality of output conductors for supplying an a-c output voltage, and means for enabling the induction machine to build up during start-up;
    a capacitor;
    a switching system, including a plurality of output connections coupled to the induction machine output conductors, a pair of additional connections coupled to said capacitor, from which additional connections a d-c output voltage can be supplied, and a plurality of semiconductor switches connected to receive gating signals to control the frequency of circuit switching; and
    means, including an oscillator-and-logic circuit, connected to regulate the turn-on times of the semiconductor switches in the switching system to thus regulate the frequency or the amplitude of output a-c energy provided by the generating system.

5. The method of generating a-c and/or d-c voltages, comprising the steps of:
    providing an induction machine having a mechanical input shaft and a plurality of output conductors;
    providing a capacitor;
    providing a switching system, coupling the switching system output connections to the induction machine output conductors, and coupling a pair of additional connections in the switching system to the capacitor;
    rotating the induction machine input shaft while supplying an excitation voltage approximately an order of magnitude less than the normal operating voltage level of the induction machine; and
    at approximately rated speed, removing the startup excitation voltage so that no external electrical energy is supplied to the system, while regulating the turn-on times of the semiconductor switches in the switching system to regulate the effective capacity coupled to the induction machine output conductors, thus regulating the amplitude or frequency of the output voltage supplied by the system.

6. A generating system for providing a-c and/or d-c voltages, comprising:
    an induction generator, having a mechanical input shaft, a plurality of output conductors for supplying an a-c output voltage, and means for applying an excitation voltage, of a level approximately an order of magnitude less than the normal rated voltage level of the induction generator, to the induction generator only during start-up;
    a capacitor;
    a switching system, including a pair of bus conductors coupled to the capacitor, a plurality of output connections individually coupled to the respective induction generator output conductors, and a plurality of controlled rectifiers individually connected to receive gating signals for controlling the rectifier conduction times;
    means, including an oscillator-and-logic circuit, connected to regulate the application of the gating signals to the controlled rectifiers to regulate the amplitude or frequency of the system output voltage; and
    means for rotating the input shaft of the induction generator.

7. A generating system as claimed in claim 6 and further comprising a voltage comparator stage, having input connections coupled both to the induction generator output conductors and to a reference voltage unit, connected to regulate operation of the oscillator-and-logic circuit to govern the timing of the gating signals in the proper sense to maintain constant the amplitude of the system output voltage.

8. A bi-directional power transfer system for transferring power in a first direction during start-up of a mechanical unit having a drive shaft and thereafter reversing the direction of power transfer from the mechanical unit to an electrical load, comprising:
    a switching system, having a pair of bus conductors, a plurality of output connections, and a plurality of semiconductor switches connected to receive gating signals for regulating turn-on of the semiconductor switches;
    a capacitor coupled to the bus conductors;
    an induction machine, having a mechanical shaft and a plurality of output conductors coupled to the plurality of switching system output connections;
    means for coupling the drive shaft of the mechanical unit to the mechanical shaft of the induction machine;

means, including a first switch, for transferring d-c energy to the switching system bus conductors during system start-up, to provide an a-c output voltage from the switching system which energizes the induction machine as a motor and transfers mechanical drive to the mechanical unit to drive it up to rated speed; and means, including a second switch, for completing an electrical circuit to transfer d-c energy from the switching system bus conductors to the electrical load as the induction machine is driven by the mechanical unit to operate as a generator which passes energy through the switching system to supply the electrical load.

9. A power transfer system as claimed in claim 8, and further comprising:

an oscillator-and-logic circuit connected to provide the gating signals for the semiconductor switches in the switching system;

a comparator stage, having a first input connection connected to receive a signal which varies as a function of the amplitude of the voltage at the induction machine output connections, a second input connection connected to receive a reference signal, and an output connection for supplying a control signal which varies as a function of amplitude variations of the induction machine output a-c voltage; and means for coupling the comparator output connection to the oscillator-and-logic circuit, to regulate the frequency of the gating signals and thus maintain constant the amplitude of the voltage at the induction machine output connections.

10. A power transfer system as claimed in claim 8, and further comprising:

an oscillator-and-logic circuit connected to provide the gating signals for the semiconductor switches in the switching system;

a comparator stage, having a first input connection connected to receive a signal which varies as a function of the amplitude of the switching system bus current, a second input connection connected to receive a reference signal, and an output connection for supplying a control signal which varies as a function of amplitude variations of the switching system bus current; and means for coupling the comparator output connection to the oscillator-and-logic circuit, to regulate the frequency of the gating signals as a function of the switching system bus current.

11. A power transfer system for providing a-c and/or d-c voltages, comprising:

an induction machine having a mechanical input shaft, a plurality of output conductors for supplying a multi-phase a-c output voltage, and means for enabling the induction machine to build up during start-up;

a switching system, including a plurality of output connections coupled to the induction machine output conductors, said system including a plurality of semiconductor switches connected to receive gating signals to control the switching frequency and periodically direct the flow of reactive energy from one phase circuit of the induction machine to another phase circuit of the machine; and means, including an oscillator-and-logic circuit, connected to regulate the turn-on times of the semiconductor switches in the switching system, to thus regulate the frequency or the amplitude of output a-c energy provided by the power transfer system.

* * * * *